Figure 1:
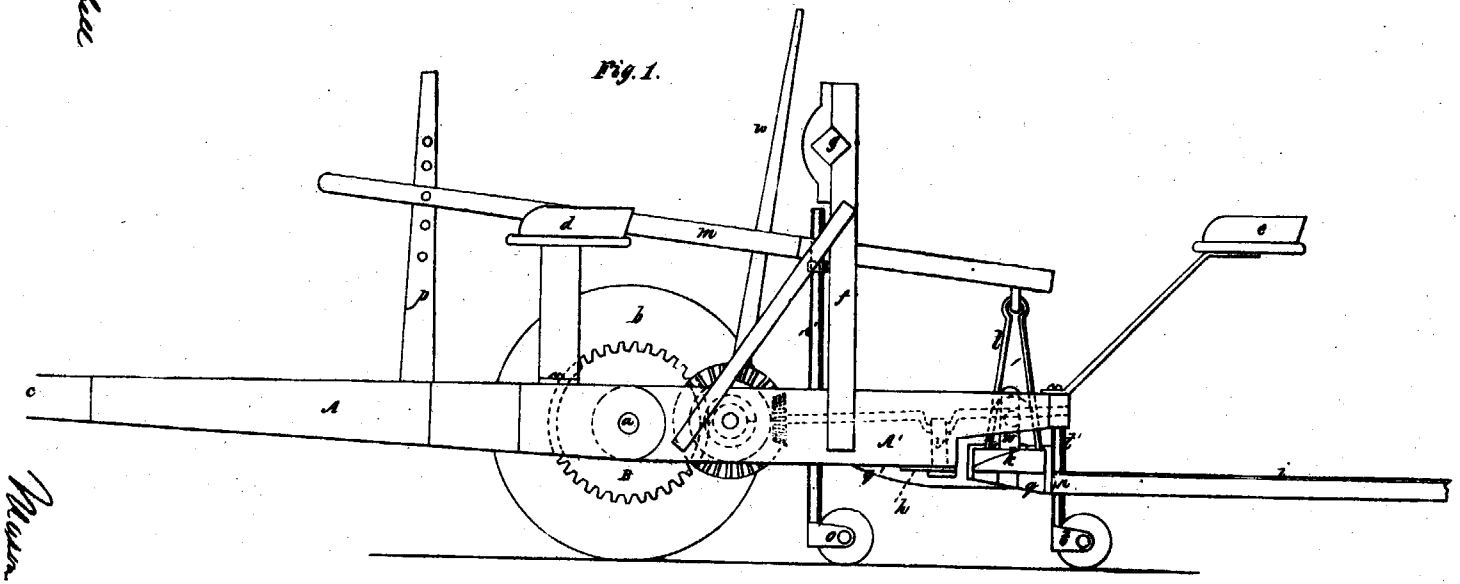

Sheet 1.
2 Sheets.

W. P. Penn.

Mower.

No. 1961

Reissued May 16, 1865

Witnesses.
R. T. Campbell
E. Schafer.

Inventor.
W. P. Penn
by his Attys.
Mason Fenwick & Lawrence

W. P. Penn.
Mower.
No 1961 Reissued May 16, 1865
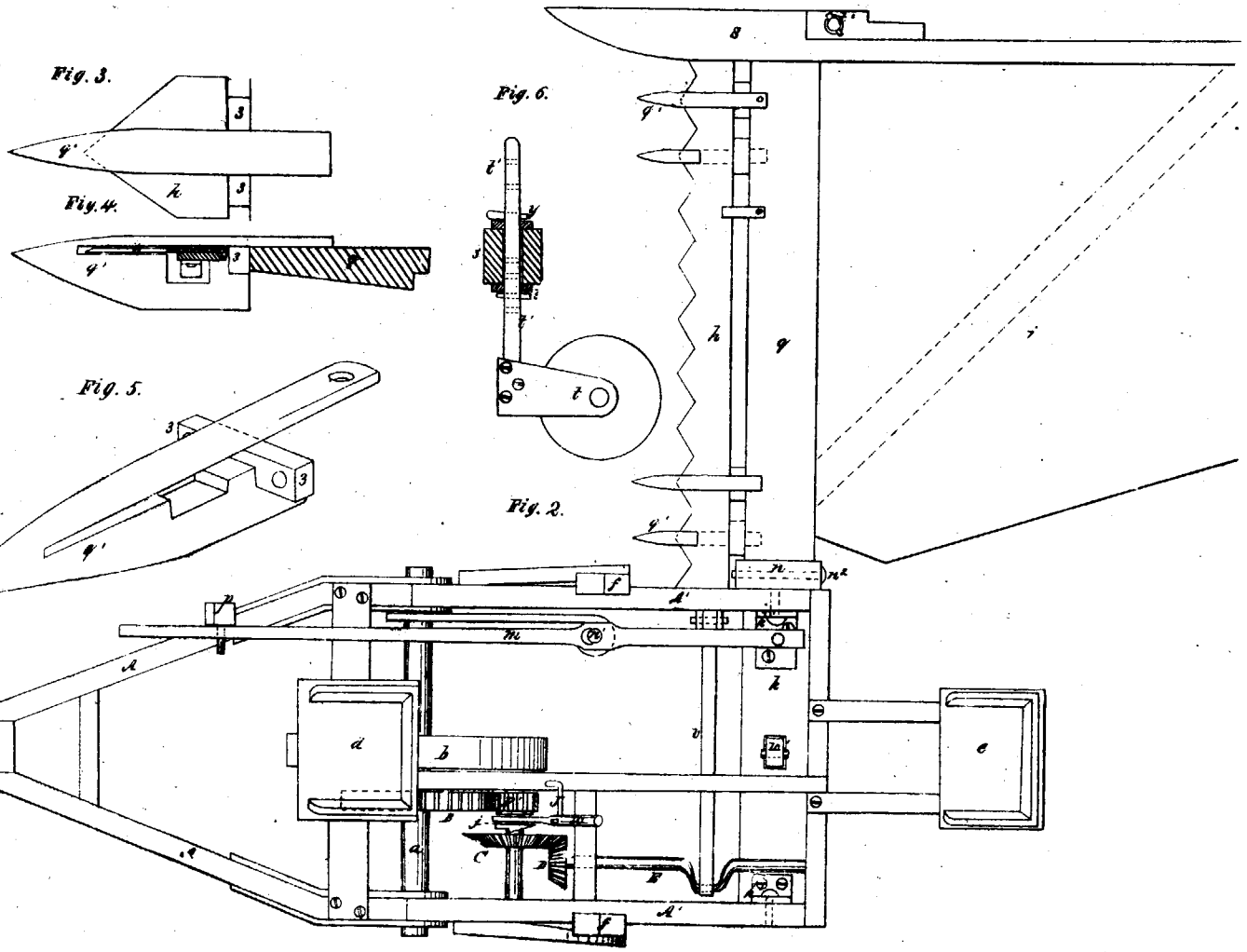
Witnesses.
R. T. Campbell
Elk Kafer
Inventor.
W. P. Penn
by his Attys
Munn & Co
Pennie & Hammond

UNITED STATES PATENT OFFICE.

WORDEN P. PENN, OF BELLEVILLE, ILLINOIS.

IMPROVEMENT IN HARVESTERS.

Specification forming part of Letters Patent No. 33,263, dated September 10, 1861; Reissue No. 1,961, dated May 16, 1865.

*To all whom it may concern:*

Be it known that I, WORDEN P. PENN, of Belleville, in the county of St. Clair and State of Illinois, have invented a new and Improved Harvester; and I do hereby declare that the following is a full, clear, and exact description thereof, reference being had to the accompanying drawings, making a part of this specification, in which—

Figure 1 is an elevation of one side of my improved machine. Fig. 2 is a top view of the machine. Figs. 3, 4, and 5 show the form and construction of the teeth. Fig 6 shows the caster-wheel for sustaining the "outer" end of the finger-bar and platform, and adjusting said end.

Similar letters of reference indicate corresponding parts in the several figures.

The main object of my invention is to attach the finger-beam to a carriage-frame which can be elevated or depressed at its rear end in such manner that the entire cutting apparatus can be adjusted and set at any desired inclination independently of the inclination given to said frame, and while this is the case provision is made for allowing the outer end of the cutting apparatus to rise and fall and accommodate itself to inequalities in the surface of the ground traveled over, or for securing the finger bar rigidly to the main frame, as will be hereinafter described.

Another object of my invention is to combine with a jointed carriage-frame, the rear portion of which is hinged or pivoted to the axle of a supporting-wheel, two caster-wheels, one of which sustains the rear portion of said frame at whatever height it may be desired to adjust it, while the other sustains the outer end of the cutting apparatus at whatever height it may be desired to adjust it, as will be hereinafter described.

Another object of my invention is to combine with a finger-beam which has a lateral rocking motion a contrivance for allowing said beam to rise and fall and accommodate itself to the inequalities of the surface passed over, and for regulating said motion.

Another object of my invention is to enable the driver to adjust the cutting apparatus and give it the desired inclination by means of a lever, which also enables him to raise or depress the rear of the main frame.

Another object of my invention is to combine with a carriage-frame, which is pivoted at or near its front end to the axle of a single main supporting-wheel, and which has its cutting apparatus pivoted near its rear end, a contrivance for enabling the driver to start or stop the motion of the sickle at pleasure, as will be hereinafter described.

Another object of my invention is to provide for sustaining the outer end of a finger-beam which has a forward and backward rocking motion, at any desired height from the ground, upon a wheel or roller, as will be hereinafter described.

To enable others skilled in the art to make and use my invention, I will describe its construction and operation.

The main supporting-frame of my machine consists of a forward portion, A, which carries the draft-pole *c*, and which is pivoted at its rear end to the transverse axle-tree *a* of the large supporting-wheel *b*, and a rear portion, A′, which is pivoted at its front end to said axle-tree, and which carries the cutting apparatus and contrivances for operating the same.

Near the rear end of the frame A′, and underneath of this frame, is suspended a transverse rocking beam, *k*, which is connected to the frame A′ by means of pivoted straps *k′ k′*, that allow the beam to rock backward and forward. Beneath this rocking beam *k* is the finger-beam *q*, which is pivoted, by means of a longitudinal bolt, $n^2$, to a strap, *n*, that is rigidly secured to the outer end of the rocking beam, as shown in Figs. 1 and 2. The inner end of the finger-beam *q* extends about half-way across the frame A′, and has an upright post, *w′*, connected to it, which passes up loosely through a hole which is made through the rocking beam *k*. By means of a pin which is passed through the post *w′*, above the beam *k*, the finger-beam can be secured rigidly to this beam *k*, so that its outer end will not rise or fall; or, if desirable, the said pin can be removed, so as to allow the finger-beam to vibrate freely about its pivot-bolt $n^2$. It will be seen that the finger-beam *q* is connected to the frame A′ by two joints, one of which allows it to rock backward and forward, so that the points of the fingers *q′* can be elevated or depressed and inclined at different angles, and the other joint allows the finger-beam, at its outer end, to rise and fall and accommodate itself to inequalities in the surface of the ground. The fingers $q'$ may be of any of the well-known forms, and they may be secured in any desirable manner to the finger-beam $q$; but the form which I have represented in Figs. 3, 4, and 5 has been found to answer the best purpose, and will be hereinafter described.

$h$ is the sickle; $s$, the divider, and $i$ the platform, which latter is connected to the finger-beam and to an outer divider-beam, $s$, and the whole are strengthened by means of a diagonal brace, which is indicated in dotted lines, Fig. 2.

A lever, $m$, is connected by a standard, $l$, to the rocking beam $k$, and projects forward of the driver's seat $d$, as shown in Figs. 1 and 2. This lever $m$ has its fulcrum upon a collar which is formed near the upper end of a caster-wheel standard, $n'$, a longitudinal slot being made through said lever to receive this standard, as shown in Fig. 2, and to allow the lever to receive a slight longitudinal movement. The forward end of lever $m$ is provided with a number of holes, which receive a pin that connects this end of the lever to a vertical post, $p$, which is also provided with a number of holes to allow the lever to be secured to it at different points. The caster-wheel $o$ has its vertical standard $u'$ connected to the frame A′ in such manner that this frame can rise and fall and still be sustained upon the caster-wheel. By depressing the forward end of the lever $m$ the driver can elevate the rear end of the frame A′, and with it the cutting apparatus; or by elevating the front end of the lever $m$ the driver can depress the rear end of the frame A′ and cutting apparatus. It will be seen that as the frame A′ moves about a center (the axle-tree $a$) the inclination of the cutting apparatus would conform to that given to this frame in adjusting its rear end up and down. This is compensated for by means of the rocking beam $k$, and the provision which is made for giving the lever $m$ a longitudinal movement. Thus when the cutting apparatus is elevated by elevating the frame A′ the driver can raise the points of the fingers by pushing the lever $m$ backward. By drawing this lever forward the front portion of the cutting apparatus will be depressed. The desired inclination of the cutting apparatus may be secured without regard to the inclination of the supporting-frame A′, and by means of the lever $m$, which is employed for elevating said frame.

The caster-wheel $o$ serves as a rear bearing for the frame A′, as well as the fulcrum of the lever $m$, and the caster-wheel $t$ serves as a support for the outer end of the cutting apparatus. The spindles of both caster-wheels are adjustable—*i. e.*, both caster-wheels sustain the rear portion of the machine at whatever height it may be desired to adjust this portion. The standard $t'$ of the caster-wheel $t$ passes up loosely through the divider-beam $s$ and receives pins and washers $y\,y$ on each side of said beam, which secure the standard in place. By removing said pins the outer end of the cutting apparatus may be set to run at any desired height from the ground. In my machine the outer caster-wheel also serves to relieve much of the strain on the joints which allow the beam K and finger-beam $q$ to rock.

The large spur-wheel B, which is keyed to the axle-tree $a$, engages with the teeth of a pinion-wheel, B′, and this pinion gives motion to the bevel spur-wheels C D when the clutch $j$ is moved into gear with the wheel C; but when this clutch is not engaged with the wheel C no motion is communicated to the bevel-wheel D. This latter wheel is keyed on the front end of a longitudinal crank-shaft, E, to the crank of which the pitman-rod $v$ is connected, which gives a reciprocating motion to the sickles $h$. A lever, $w$, which has its fulcrum at J, is used by the driver for moving pinion-wheel B′, having the clutch $j$, and starting or stopping the motion of the sickle-bar.

The finger-beam $k$ is made narrower at its front edge than it is at its back edge, as represented in Figs. 1 and 4, and the fingers $q'$ may be secured to this beam by an upper extension projecting over the finger-bar and receiving bolts through it, as represented in Figs. 3, 4 and 5; or this upper extension may be omitted and a lower extension projecting under the finger-bar used in its stead. In connection with these modes of securing the fingers to their bar or beam I employ lateral flanges $z\,z$, which abut against the edge of the finger-beam and receive screws through them for securing the fingers to this beam. The flanges $z$ also constitute a back guide for the sickle-bar, as shown in Fig. 4.

In my invention I do not confine myself to the exact construction of frame A and A′, as a differently-constructed frame can be used and the same results be attained; nor do I confine my invention to a single main-wheel machine, as it may be applied to a two main wheel machine by a little variation.

Having thus described my invention, what I claim as new, and desire to secure by Letters Patent, is—

1. The combination of the jointed frame, by which the sickle may be elevated, with the means for counteracting the angularity that would otherwise effect the operation of the sickle, and with a finger-bar which may be either flexible or rigid, the whole constructed and arranged in the manner described.

2. Connecting the finger-bar to the frame by means of the hinge-joint and the upright, in the manner described, so that the connection with the said frame may be made either flexible or rigid, as specified.

3. The arrangement of the transverse rocking beam $k$ on the under side of frame A′, in combination with the finger-bar $q$, substantially in the manner and for the purpose described.

4. Arranging the transverse rocking beam $k$ on the under side of the frame A′ and pivoting the finger beam *q* to it thus arranged, substantially in the manner and for the purpose herein described.

5. Applying the lever *m* to the machine in such manner that it will serve the double purpose of elevating the cutting apparatus and also of tilting it forward or backward, substantially as described.

6. The arrangement of the two caster-wheels *o t*, frame A A′, jointed upon the axle-lever *m*, serving the double purpose described, and finger-beam *q* and rocking beam *k*, in the manner and for the purpose herein described.

7. Arranging the spur-wheel B, sliding pinion-wheel B′, clutch *j*, lever *w*, bevel clutch-wheel C, crank-pinion D, with the frame A A′, rocking beam *k*, and jointed finger-beam *q*, all in the manner and for the purpose described.

8. The draft-pole C, in combination with frame A, the rear of which frame is pivoted oted to the axle-tree *a*, and with the gearing to the axle-tree *a*, and with frame A′, also piv- and cutting apparatus, all constructed and applied substantially in the manner and for the purpose described.

W. P. PENN.

Witnesses:
THEOD. I. KRAFFT,
LOUIS P. KRAFFT.